July 3, 1934.  N. S. LINCOLN  1,964,956
DRIVING MECHANISM
Filed Nov. 17, 1932  2 Sheets-Sheet 2
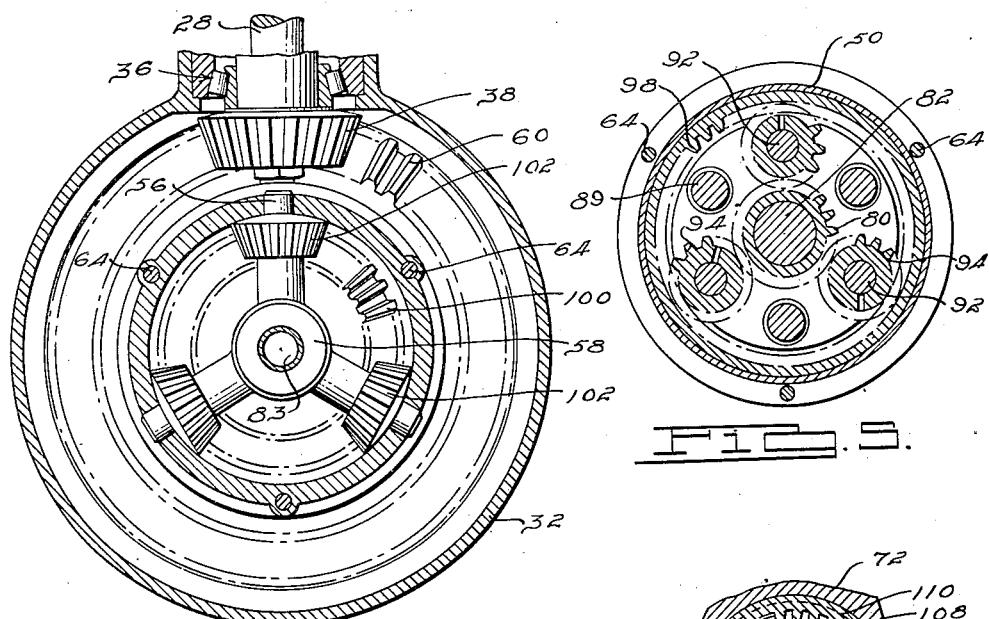
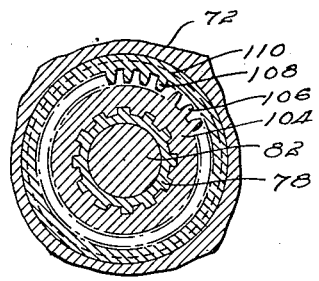
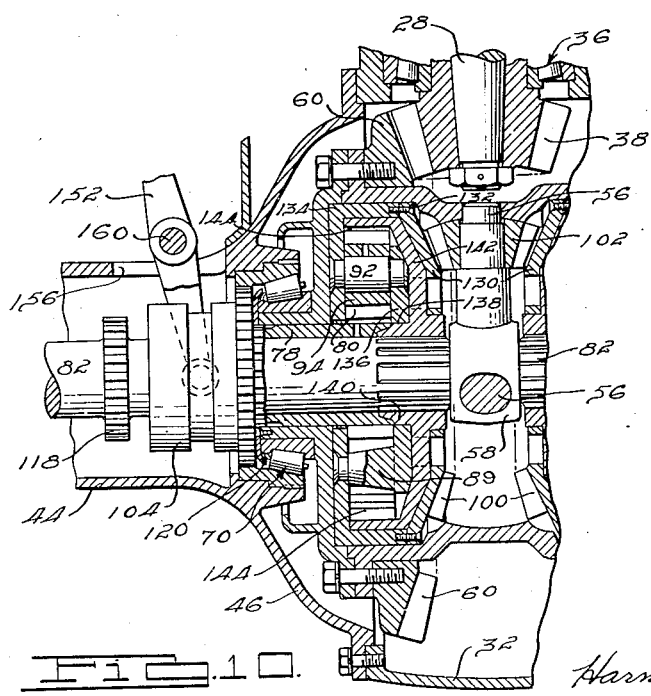
INVENTOR
Neil S. Lincoln.
BY
Harness, Dickey, Pierce & Hann.
ATTORNEYS.

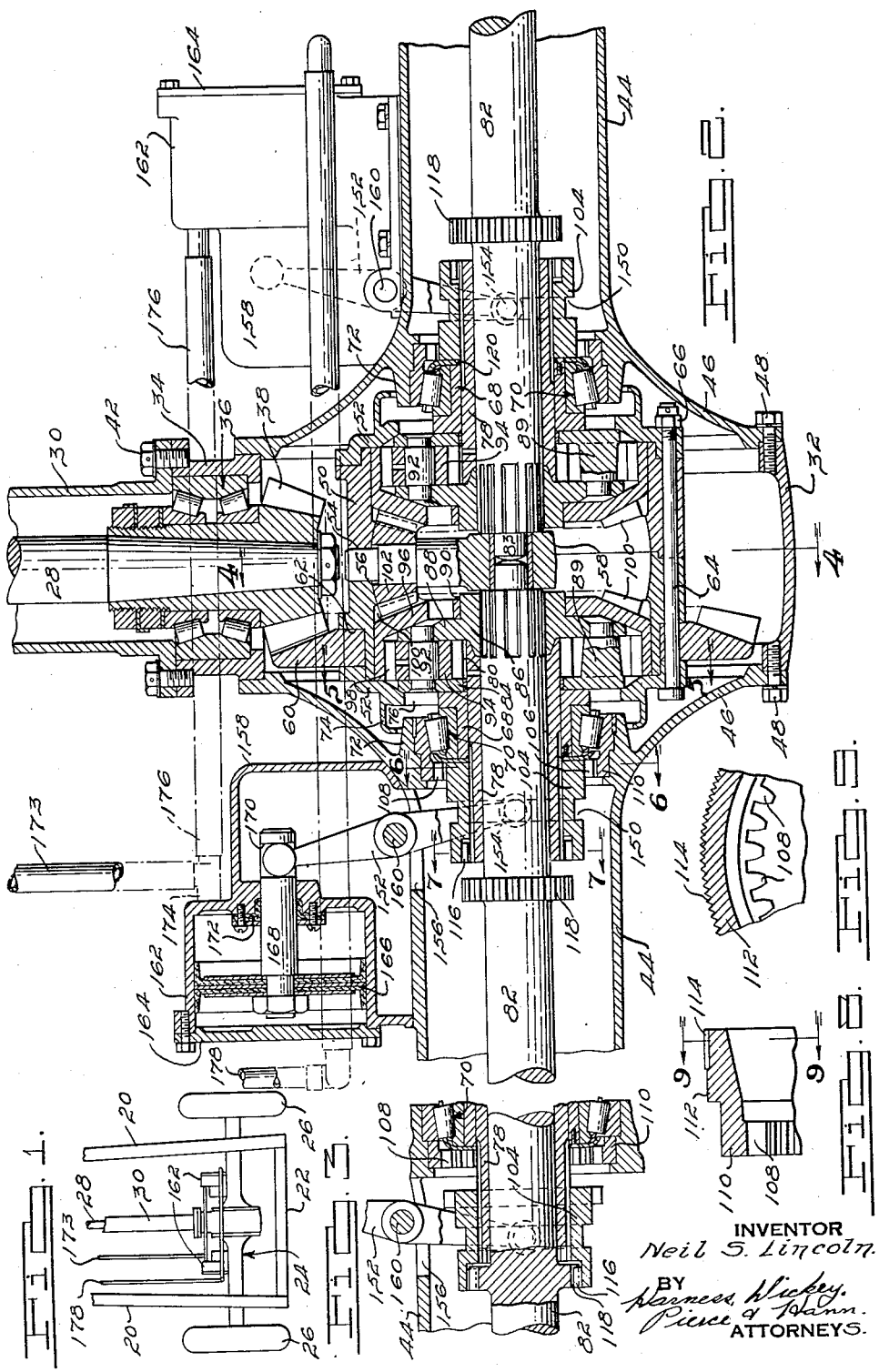

Patented July 3, 1934

1,964,956

UNITED STATES PATENT OFFICE 1,964,956

DRIVING MECHANISM

Neil S. Lincoln, Detroit, Mich.

Application November 17, 1932, Serial No. 643,021

14 Claims. (Cl. 74—99)

This invention relates to driving mechanism and particularly to that type thereof commonly employed in the driving axles of motor vehicles and more particularly to that type of driving axle mechanism not only including a standard gear ratio driving means but including in addition further means for selectively effecting a modification of such standard gear ratio, the principal object being the provision of a driving mechanism of this type that is relatively simple, compact and efficient in operation.

Another object is the provision of a driving mechanism of the type described which may be designed to effect either an overdrive or an underdrive of the standard gear ratio without materially affecting the principal features of construction thereof.

Another object is the provision of a driving mechanism of the type described of such design as to permit a wider range of gear ratio variation in the over or under drive mechanism, from the standard gear ratio, than similar structures heretofore suggested.

Another object is the provision of a driving mechanism of the type described which permits the same enclosing housing to be employed whether or not the added driving ratio is provided in the mechanism, or is omitted from the same.

Another object is the provision of a driving mechanism of the type described which provides for a well balanced distribution of driving forces and driving loads on the parts thereof, thereby permitting substantially equal loading and use of conventional bearings.

Another object is the provision of a driving mechanism of the type described which may be modified in accordance with the load to be transmitted simply by the addition of gear members to certain parts thereof, and without necessitating an increase in size of the parts thereof.

Another object is the provision of a driving mechanism of the type described, in which the impact due to shifting from one gear ratio to another, at speed, is distributed equally to a plurality of clutches and bearings, thereby resulting in a structure less subject to wear and tear than existing structures.

Another object is the provision of a driving mechanism of the type described in which the inertia forces set up during changing from one gear ratio to another may be much smaller than in constructions heretofore proposed, thereby permitting easier and quicker shifting of the parts thereof, thus eliminating heavy imposed shock or impact load, which have been proved to be of great disadvantages in existing structures.

Another object is the provision of a driving mechanism of the type described in which the gearing for effecting an additional driving ratio is completely housed within the differential casing where it is continually subjected to the action of the lubricant contained therein, while the clutch elements selectively employed for effecting either the standard or the additional driving gear ratio are disposed exteriorly of the differential housing and in a position where they are not directly exposed to the lubricant within the differential casing, thereby eliminating the retarding effects of such lubricant upon the clutch elements particularly noticeable in cold weather.

A further object is to provide a novel means for shifting the shiftable elements of a two-speed axle structure.

The above being among the objects of the present invention, the same consists in certain features of construction and combinations of parts to be hereinafter described, and then claimed, having the above and other objects in view.

In the accompanying drawings which illustrate suitable embodiments of the present invention and in which like numerals refer to like parts throughout the several different views, Fig. 1 is a fragmentary, plan elevational view of an automobile chassis in which the present invention is incorporated.

Fig. 2 is an enlarged, fragmentary, horizontal sectional view taken centrally through the central portion of the driving axle shown in Fig. 1, the clutch elements being shown in a position to effect an under drive of the standard gear reduction ratio.

Fig. 3 is a fragmentary view of the construction shown in Fig. 2 but illustrating the position of one of the clutch elements when moved to a position for effecting a direct drive or standard gear reduction.

Fig. 4 is a sectional view taken on the line 4—4 of Fig. 2.

Fig. 5 is a sectional view taken through one of the planetary gear units as on the line 5—5 of Fig. 2.

Fig. 6 is a fragmentary sectional view taken on the line 6—6 of Fig. 2.

Fig. 7 is a sectional view taken on the line 7—7 of Fig. 2.

Fig. 8 is an enlarged fragmentary sectional view of the outer race member for one of the bearings supporting the differential assembly illustrated in Fig. 2, and taken as in the same plane as Fig. 2.

Fig. 9 is a fragmentary sectional view taken on the line 9—9 of Fig. 8.

Fig. 10 is a view similar to Fig. 2, but showing the application of the invention to a two speed axle of the overdrive type.

As previously brought out, the present invention relates to a driving mechanism particularly adapted for use in connection with motor vehicles and particularly to that type thereof in which means is provided in the driving mechanism for effecting a gear ratio, in addition to the usual direct driving ratio and different therefrom. Such constructions are commonly known as two speed axles.

The present invention is applicable for instance, to the rear axle structure of conventional front engine, rear drive motor vehicles and this regardless of whether the rear axle structure is of the full floating type or any other type. The structure is also applicable to front wheel drive types of motor vehicles and to rear engine, rear drive types of motor vehicles, but in view of the fact that the first mentioned type is the one being most universally manufactured at the present time, the present invention is shown herein, as a matter of illustration only, with the rear axle driving mechanism for such type of vehicles, it being understood that its application to any other type of vehicle is a matter which is well within the skill of the usual designer of motor vehicles.

In the construction of such axle mechanisms as heretofore proposed, the additional speed ratio has been obtained by the use of a planetary gearing system suitably connected up between the differential mechanism and the driving axle or jack shaft, selective means being provided rendering the planetary unit active or inactive in order to obtain either the direct driving ratio between the usual ring gear and pinion, or to obtain an increased or decreased ratio as compared thereto. However, as far as I am aware, the constructions that have heretofore been proposed have been such that they have been adapted solely to either an overdrive of the usual gear ratio or an underdrive thereof, whereas by the use of the present invention, by very slight and simple changes, either an overdrive or an underdrive, as desired, may be provided for a particular axle structure.

Furthermore, in such constructions which have been designed for a two-speed axle structure, as differentiated from prior structures of a somewhat similar nature but in which it has been attempted to incorporate the full and complete change speed gear mechanism within the axle housing, only one planetary gear unit has been provided for transmitting the driving effort from the propeller shaft to the axle shafts. The result of this has been that the planetary gear unit has necessarily been of relatively large dimensions, has necessarily been placed completely to one side of the conventional differential mechanism and has thereby resulted in a structure unbalanced in appearance as well as in transmission of driving effort, and has necessitated the employment of unusually large bearings for supporting the planetary gear side of the differential casing, thus making it entirely impractical to employ the same gear casing for use in a vehicle not equipped with the added final driving ratio.

In the present invention, two planetary gear units are provided, one on each side of the differential mechanism and each connected to a single driving or jack shaft. The result of this is that the structure is not only balanced in appearance and in the transmission of driving forces from the propeller shaft to the driving or axle shafts, but it permits the use of differential supporting bearings of conventional dimensions and permits the use of the same axle housing for final drive mechanisms not including the additional planetary units. Obviously, this effects a considerable saving in production cost where the two-speed axle is provided as optional equipment by the manufacturer.

Compactness of the unit embodying the present invention is readily accomplished by forming one of the members of each of the planetary units as a part of the differential gearing system and preferably an integral part of the same, the resulting structure being of such diminished dimensions longitudinally of its axis as to permit both the differential mechanism and the planetary unit to be supported between the bearings provided for supporting the mechanism, as differentiated from previously suggested constructions in which a planetary unit has necessarily been provided beyond such bearing.

In the two-speed axle constructions heretofore suggested, it has, of course, been necessary to subject the planetary unit to a constant bath of lubricant in order to insure proper lubrication thereof. In all such constructions, as far as I am aware, the clutch elements employed for selectively effecting either the direct or over or underdrive, have been positioned so as to be exposed to this bath of lubricant. The result has been that in cold weather when the lubricant in the axle housing provided for lubrication of the differential and planetary units congeals and becomes relatively stiff and hard, it often becomes practically impossible to cause engagement or disengagement of these clutch units until the vehicle has run a sufficient distance to soften up the lubricant, and even then because of the stiffness of the lubricant movement of the clutch members remains relatively difficult. The present invention eliminates this disadvantage in conventional constructions by locating these selective clutch elements outside of the zone of the lubricant, thereby eliminating the possibility of the congealed or stiff lubricant from interfering with the ease of operation thereof.

Because of the dimensional limitations necessarily observed in the production of an axle mechanism of the type described, two-speed axles of the types heretofore proposed have necessarily been limited in the degree of difference which they provide in the over or underdrive relative to the standard ratio of the axle mechanism, and the present invention is particularly desirable in this respect that it provides for a possible greater variation in the over or underdrive from the standard ratio than in the constructions heretofore proposed.

Many of the above advantages as well as other advantages that will hereinafter be specifically pointed out or will be apparent to those skilled in the art, are made possible by the fact that by the use of the present invention substantially all of the mechanism outside of the selective clutches for the axle mechanism are contained within the differential casing, and the over or underdrive gearing is actuated by the differential gears. The importance of this feature will be readily recognized by those skilled in the art.

Referring now to the drawings and particularly to Fig. 1, a motor vehicle chassis is shown including chassis frame side rails 20, a cross rail 22, a rear axle structure indicated generally as at 24 carrying wheels 26 at its outer end, propeller shaft 28 and propeller shaft housing 30. The rear axle mechanism 24 includes means for transmitting the driving force from the propeller shaft 28 to the wheels 26 including a ring gear and pinion of conventional construction having a predetermined standard ratio, together with means for modifying this ratio within the rear axle 24. In the construction illustrated in Figs. 2 to 9 inclusive, this mechanism provided for effecting an added ratio between the propeller shafts and the wheels takes the form of an underdrive, that is, a mechanism which, when operative, effects an increased gear ratio between the propeller shaft 28 and the wheels 26, while in Fig. 10, a slightly modified form of construction is illustrated by the use of which a decrease in the standard gear ratio may be effected. The construction employed in the axle 24 for supporting the wheels 26 thereon and for supporting the outer end of the axles or jack shafts forming no part of the present invention, may be considered to be any suitable or conventional type or form.

Referring now to Fig. 2, it will be noted that the rear axle housing is of a conventional type including an annular central portion 32 having a tubular radial extension 34 projecting forwardly therefrom which serves to house the bearing assembly 36 supporting the rear end of the propeller shaft 28 and driving pinion 38 secured thereto in a conventional manner. The propeller shaft housing 30 is secured to the extension 34 by means of screws 42 and serves to maintain the bearing assembly 36 in position in a conventional manner. The remainder of the axle housing structure includes the conventional outwardly extending tubular members 44, outwardly flanged at their inner ends as at 46 where they are piloted within and secured to the central portion 32 as by means of screws 48.

The differential housing includes a central portion 50 of generally tubular construction and end portions 52, the central portion 50 being formed in two parts having a line of separation centrally between the ends thereof and provided with matching depressions 54 opening on the line of split for receiving the ends 56 of a conventional type of differential spider 58. Although any suitable type of differential spider may be employed, the particular one shown, as best brought out in Fig. 4, is of the three arm type as employed in many conventional constructions.

The ring gear 60 which meshes with the pinion 38 is received and clamped between a radial shoulder 62 formed on the left hand half of the central portion 50 of the differential casing and the left hand end portion 52, all of the members 50, 52 and 60 being clamped and locked together by means of bolts 64 extending between the end members 52 and through the ring gears 60 and central portion 50 of the differential casing, suitable nuts such as 66 being provided for cooperation with the bolts 64.

Each of the end members 52 of the differential casing is provided with an integral outwardly extending tubular projection 68 which is received within the inner race of a bearing assembly indicated generally in Fig. 2 as at 70. The outer race of each bearing assembly 70 is fixed within a corresponding collar-like part 72 formed integrally with the corresponding axle housing member 44. This outer race, in accordance with a more limited feature of the present invention is preferably of a novel construction which will hereinafter be more fully described. The differential housing and the parts carried thereby is accordingly rotatably mounted in the bearing assemblies 70.

The end members 52 of the differential casing are each preferably provided with an axially extending tubular extension or skirt portion 74 which extends over a portion of the corresponding collar 72 so as to protect the corresponding bearing assembly against the application of an excessive amount of lubricant, although it may be noted that openings such as 76 are provided in the end members 52 in order to permit a flow of lubricant therethrough to parts within the differential casing.

Within each of the tubular extensions 68 of the differential housing is rotatably received a sleeve member 78 which projects both inwardly beyond corresponding ends of the tubular extension 68 and each has integrally formed on its inner end a gear 80 which forms the sun gear of the corresponding planetary system which will hereinafter be described. Within each of the sleeves 78 is rotatably received the inner end of the corresponding axle or jack shaft 82 of the axle structure. If desired, the inner ends of the shafts 82 may be formed to provide a pilot 83 projecting into and having bearing in a complementary opening formed in the center of the spider 58, which thus provides an additional support for the inner ends of the shafts 82.

Rotatably supported on the inner end of each sleeve 78 between the inner face of the corresponding end member 52 of the differential casing and the corresponding sun gear 80 is a disc-like member 84. The inner end of each of the shafts 82 is splined and non-rotatably receives thereon inwardly of the corresponding sun gear 80 a member 86 having a radially extending flange portion 88 and an inner cylindrical bearing surface 90. The outer face of each flange portion 88 is spaced from the inner face of the corresponding disc 84 by an amount equal to the width of the sun gear 80 and carried between each flange 88 and corresponding disc 84 is a plurality of, shown in Fig. 5 as three, pins or trunnions 92 on each of which is rotatably received a planet pinion 94 which lies in mesh with the corresponding sun gear 80. In order to insure a rigid connection between the disc 84 and the flange 88, a plurality of risers 89 are formed integrally with the disc 84 between the pins 92 and have their projecting ends closely embraced in openings in the flange 88.

Rotatably received on each of the cylindrical bearing portions 90 is an outwardly facing cup-shaped member 96, the periphery of which may also have bearing against the inner surface of the central portion 50 of the differential casing. The peripheral portion of each of these cup-shaped members 96 is formed to provide an internal gear 98 which lies in meshing relationship with the corresponding planet pinions 94. The inner side or bottom faces of each of the cup-shaped members 96 is formed to provide an inwardly facing differential side gear 100 which meshes with the differential pinions 102 rotatably supported upon the outer ends of the arms of the spider 58, thus forming the usual differential mechanism. Suitable openings are provided in an appropriate number of these parts to permit a sufficient amount of lubricant to find its way between them to effect proper lubrication of the bearing surface.

The outwardly projecting end of each of the sleeves 78 is externally splined and axially slidably receives thereon a sleeve member 104, the inner end of which is provided with outwardly projecting teeth 106, simulating a spur gear which, when the sleeve 104 is shifted inwardly, are adapted for inter-engagement with complementary inwardly projecting teeth 108 provided on an outwardly extending axial extension 110 of the outer bearing race for the bearing assembly 70. The outer bearing race for one of the bearings 70 is shown in enlarged fragmentary section in Figs. 8 and 9, as at 112, from which it will be noted that a portion of the length of the outer cylindrical surface of the race 112 is serrated as at 114 so that when the race 112 is pressed into the collar 72 the serrations 114 will be embedded in the metal of the collar 72 and maintain the race 112 and extension 110 from rotation. The former practice with respect to this part of the construction is to make the part 110 separate from the bearing race 112 and to serrate the outer surface of the member 110, but due to the fact that the outer surface of the bearing race 112 is larger in diameter than the portion 110, I find that by making the part 110 integral with the outer bearing race 112 and serrating a portion of the length of the outer bearing race, the member 110 with its teeth 108 is more securely fixed against rotation. Due to the fact that only a portion of the length of the bearing portion 112 is serrated, accuracy of its position within the collar 72 is not affected in any manner whatsoever.

The outer ends of each of the sleeves 104 is formed to provide inwardly directed teeth 116 forming a part of another positive clutch. These teeth 116, which are arranged in a manner similar to an internal gear, are adapted for engagement with the outwardly projecting teeth of a member 118 in the form of a spur gear and formed integrally on the corresponding shaft 82. It will be noted in the position of the parts indicated in Fig. 2 the sleeve member 104 has been axially shifted inwardly to the extremity of its limits so that the outwardly projecting teeth 106 are engaged between the teeth 108 of the member 110 which, being fixed against rotation in the axle housing, thus lock the collar 104 and consequently the sleeve 78 and sun gear 80 against rotation. When the collar 104 is shifted outwardly to the opposite extreme of its movable position the teeth 106 are withdrawn from engagement with the teeth 108 and the teeth 116 are non-rotatably engaged with the member 118, as indicated in Fig. 3. Consequently, in this position the planetary mechanism and side bevel gear are locked together for equal rotation with the shaft 82.

In the above described construction, it will be apparent that upon rotation of the propeller shaft 28 and pinion 38 rotational movement will be imparted to the ring gear 60 and consequently the differential casing including the casing members 50 and 52. The differential casing in rotating will carry around with it the differential spider 58 and differential pinions 102. The driving movement from the differential casing 50 will be transmitted therefrom to the axle shafts 82 from the differential pinions 102 thru the differential side gears 100 and from the side gears 100 to the planetary system, regardless of whether the latter is then operative or not. It will therefore be apparent that the drive transmitted from the differential casing to each of the axle shafts is through an independent planetary gearing system and that relative movement may occur between the two differential side gears 100 to effect any differential action required without in any way effecting the function of the differential mechanism or of the planetary gear system.

Now assuming the parts to be in the position indicated in Fig. 2, it will be apparent that upon rotation of the differential housing 50 carrying with it the spider 58 and differential pinions 102 a correspondng rotational movement will be imparted to the differential side gears 100 and their corresponding members 96 which carry the internal gears 98. The internal gears 98 in rotating will attempt to rotate the planet gears 94 on their pins 92 and because of the fact that when the mechanism is in the position indicated in Fig. 2 the sun gear 80 is fixed against rotation, such rotation of the planet gears 94 about the sun gear 80 will occur and in rotating will act through their respective pins 92 to cause a rotation of the members 86 which carry the pins 92 at a rotational speed lower than the rotational speed of the internal gear 98. Inasmuch as the member 86 is fixed against rotation to the axle shafts 82, the axle shafts 82 will be caused to rotate at a speed corresponding to the speed of rotation of the member 86 and which is less than the rotational speed of the internal gears 98. The internal gears 98, because of the fact that they rotate in direct accordance with the rotational speed of the differential casing 50, thus rotate in direct accordance with the ratio of reduction between the driving pinion 38 and ring gear 60, consequently the axle shafts 82 will rotate at a speed less than the speed of the ring gear 60 and effect what is generally known as an underdrive.

When the sleeves 104 are moved to their outer position as indicated in Fig. 3, then as before described, the sun gears 80 are locked to their respective shafts 82 for equal rotation therewith, and due to the fact that the pins 92 of the planet gears 94 are always locked to their corresponding shafts 82 for equal rotation therewith through their respective members 86, no rotational movement of the planet pinions 94 on their pins 92 can occur and consequently the planetary systems are locked within themselves so that each must rotate as a single member. Obviously, when the mechanism is in this condition, the shafts 82 rotate directly with the ring gear 60 and the only reduction in drive afforded between the propeller shaft 28 and axle shafts 82 is exactly that provided by the ratio between the driving pinion 38 and the ring gear 60.

At this point, it is desired to call attention to some of the salient features of the above described construction and the resulting advantages thereof. For instance, it is to be noted that the differential mechanism is driven directly from the ring gear and in turn is employed for driving the planetary gearing system. This permits the differential side gears to act as the driving members for the planetary gear system, the driven member of each planetary system being non-rotatably secured to its respective axle or jack shaft, so that the side gears of the differentials are entirely separate from the jack shafts.

Another feature is because of the fact that each jack shaft is driven through its own separate planetary system the planetary systems may be made of such dimensions as to be axially received within the inner diameter of the ring gear or an axial continuation of such diameter, and yet be of sufficient size to transmit the required load. This feature enables the members 96 to function both as a differential side gear and as an internal gear for the planetary system which permits the provision of a construction having a minimum axial length. It also permits all of the mechanism except the positive clutches which control the operativeness of the planetary system to be completely housed within the differential casing, and also permits this casing with its associated parts to be supported between bearings of conventional sizes, resulting in considerable economy of manufacture. Furthermore, because of the fact that the structure is balanced as to its midpoint both in appearance and transmission of forces, it is possible for a manufacturer of motor vehicles to provide a two-speed axle structure as optional equipment on his product and where such two-speed feature is not required to mount the usual single speed differential mechanism between the same two bearings as are employed in the two-speed axle and in the same axle housing as is provided for the two-speed axle. This results in a considerable economy on the part of a manufacturer due to the fact that but one axle housing is required for production and service.

Another feature is that the clutch collars 104 and their cooperating parts are exterior to that part of the rear axle structure which carries a relatively large amount of lubricant for effecting proper lubrication of the differential and planetary gears, this being contrary to previously suggested constructions of a similar nature in which corresponding clutch parts are exposed to such lubricant. As is well known by those skilled in the art the type of lubricant employed for the purpose of lubricating the various parts of the rear axle structure is of a heavy and viscous nature which, when subjected to the relatively low temperatures often met with during winter, becomes hard and offers considerable resistance to ready deformation. Obviously, where the working faces of such clutch elements are subjected to direct contact with a bath of such lubricant, as in constructions heretofore proposed, it becomes extremely difficult if not impossible in some cases to shift these clutch elements while the lubricant is in such condition. By positioning the clutch collars 104 exteriorly of the bearings 70, interference with movement of the collars 104 because of stiff or hard lubricant is effectively eliminated. It may be well at this point to call attention to the fact that, as an added precaution for preventing a material leakage of lubricant from the differential casing through the bearing assembly 70, I preferably provide an oil slinger or oil throw off ring such as 120 on the outer end of each tubular extension 68 of the differential housing, the outer edges of the ring slightly overlapping the rollers of the bearing assembly 70 so as to deflect any grease that might tend to find its way through the bearings back to the central portion of the axle structure.

Another feature of this construction is that it permits a greater difference of ratio to be provided in the planetary system as compared to the ratio between the ring gear and pinion, than in similar structures heretofore proposed. The reason for this is that in this construction the differential side gears are separated from the axle shafts 82 which thus makes the planetary system dimensionally independent to a greater degree than in the heretofore proposed construction. It might also be mentioned at this point that for any given size of planetary structure any greater demand for increased torque through the structure may be obtained without the necessity of increasing the size of the structure simply by the addition of an added number of planet gears 94, which is relatively easily taken care of.

Another feature which it is desired to call attention to is that by reason of using two planetary systems, one between each axle shaft and the differential housing, the planetary systems have a considerably lower inertia than in similar constructions employing but a single planetary structure, and this is important from the viewpoint of effecting a noiseless operation of the clutch collars 104, a point of practical importance in such design. Another effect along this line is that the impact forces due to shifting at speed in this construction is distributed equally to both of the positive clutch members and to their bearings, consequently reducing the resulting impact on both the clutches and the bearings for the differential mechanism.

Under some conditions it is desirable in a two-speed axle that the additional speed constitutes an overdrive of the standard gear ratio rather than an underdrive as heretofore described. As far as I am aware, constructions heretofore proposed have been such that if it were attempted to change, for instance, an underdrive construction to an overdrive construction or vice versa, the identity of the original mechanism will be substantially destroyed in making the change. An important feature of the present invention is that such a change may be made in the above described mechanism by modifying the construction of a very relatively few parts. The ease with which this may be done is brought out in connection with Fig. 10 which illustrates the construction shown in the previous figures modified to effect an overdrive instead of an underdrive as provided in the previously described figures and these modifications will now be described.

Referring to Fig. 10, it will be noted that for an overdrive the differential side gears 130 are not connected to the internal gears of the planetary systems as in the underdrive construction, but instead each is secured at its outer end as by means of screws 132 or other suitable fastening means to the rim of a cup-shaped member 134, which serves as the driving member of the corresponding planetary mechanism, and the bottom of which corresponds to the disc member 84 in the previously described construction in that it supports one end of the pins 92 which carry the planet gears 94. The opposite ends of the pins 92 are carried by a disc member 136 positioned immediately inwardly of the sun gear 80 and bears upon the cylindrical surface 138 of a member 140 corresponding to the member 86 in the previously described construction and splined on the end of the corresponding axle shaft 82. The disc 136 is thus rotatable upon the member 140. Each member 140 in this case is provided with an integral cup-shaped portion 142 which lies within the enclosure formed by the differential side gear 130 and cooperating cup-shaped members 134, and this rim is interiorly formed to provide the internal gear 144 of the corresponding planetary mechanism. Accordingly, it will be recognized that in the case of the overdrive the differential side gears 130 directly drive the carrier for the planet gears 94 instead of the internal gear as in the previously described construction and the internal gear is, in the case of the overdrive, fixed against rotation with respect to the corresponding axle shaft 82. All of the rest of the parts of the structure are identical to the parts in the previously described construction.

With this construction, it will be apparent that when the collars 104 are shifted inwardly so as to lock the sleeves 78 against rotation the sun gears 80 are consequently locked against rotation and the differential side gears 130, in rotating, carry with them the pins 92 upon which the planet gears 94 are mounted. The planet gears 94 in being carried around with the pins 92 are caused to rotate because of their engagement with the sun gear 80 and consequently cause the internal gears 144 to be rotated about the axes of the axle shafts 82 at a greater rate of rotation than the ring gear 60, thus effecting an overdrive.

When the collars 104 are shifted outwardly so as to lock the sun gears 80 against rotation relative to the axle shafts 82, then both the sun gears 80 and the internal gears 144 are caused to rotate in unison with their respective shafts 82 and the planetary systems are thus rendered inoperative to effect any variation of speed of the axle shafts 82 with respect to the ring gear 60. Obviously, all of the advantages of the previously described construction are maintained in the construction disclosed in Fig. 10.

In the broader aspect of the present invention any suitable means may be provided for simultaneously shifting the clutch collars 104, but a more limited feature of the present invention is the provision of a novel means for accomplishing such shifting and this means will now be described. Referring to Fig. 2, it will be noted that each clutch collar 104 is provided with a central peripheral groove 150. The yoked end of a double arm lever 152 straddles each of the clutch collars 104 and is provided with inwardly directed pins 154 engaged in the slot 150 of the corresponding collar 104 on diametrically opposite sides of the same.

Each member 44 of the axle housing structure is provided with a forwardly disposed opening 156 through which the lever 152 projects, and over this openng a casing 158 is suitably secured to each member 44. A pivot pin 160 extending between opposite sides of the casing 158 journals each lever 152 for rocking movement. Each casing 158 has integrally formed therewith an outwardly opening cylinder 162, the outer end of which is suitably closed by a cylinder head or cover 164. Within each cylinder 162 is received a piston 166 having a piston rod 168 projecting toward the center of the axle through the integral inner end of its corresponding cylinder 162. The inwardly projecting end of each piston rod 168 is cut away as at 170 so as to slidably receive therein the forward end of the corresponding lever 152 while holding it against relative axial movement. Suitable packing 172 is provided about each piston rod 168 at the point where it projects through the inner end wall of its cylinder 162.

A single tube 173 connected with a suitable source of energy such as a fluid under pressure or a source of suction, or to a suitable exhausting point, extends rearwardly from the forward part of the vehicle to a point approximate to one of the cylinders 162, where it branches as at 174 and 176, one branch leading through the inner end wall of one cylinder 162 and the other branch leading through the inner end wall of the other cylinder 162. A second single tube 178 connected to a suitable source of pressure as in the case of the tube 172, or to a suitable exhausting point, as the case may be, extends rearwardly from the forward part of the car to a point proximate to one of the cylinders 162 where it branches, one branch being connected to the interior of the cylinder 162 through one of the cylinder heads or covers 164 and the other branch being connected to the interior of the other cylinder 162 through its cylinder head or cover 164. Suitable valve mechanism (not shown) positioned at a point favorable to its easy manipulation by the driver of the vehicle, controls the admission of or relief of fluid pressure through the tubes 172 and 178 so as to cause simultaneous operation of the pistons 166 in a corresponding direction to thus cause simultaneous and corresponding shifting movement of the clutch collars 104. The provision of a separate cylinder and piston for effecting shifting movement of each of the clutch collars 154 permits the use of relatively small cylinders 162 which, accordingly, are relatively inconspicuous and also afford relatively little possibility to contact with obstructions on the road or other surfaces upon which the vehicle is traveling. Likewise, the use of the single tube from the control mechanism to a point proximate to the rear axle structure involves a simplification and economy of structure without in any way affecting its satisfactory functioning.

Formal changes may be made in the specific embodiments of the invention disclosed without departing from the spirit or substance of the broad invention, the scope of which is commensurate with the appended claims.

I claim:—

1. In a driving mechanism, in combination, a ring gear, a differential housing fixed thereto for equal rotation therewith, a pair of axle shafts projecting into said housing, differential gears in said housing including pinions bodily movable with said casing and a pair of side gears in mesh with said pinions and rotatable relative to said axle shafts, a pair of planetary gear mechanisms including an internal gear unit, a sun gear unit and a planetary pinion unit, one of said units of each of said planetary gear mechanisms being fixed against relative rotation with respect to the corresponding of said side gears, another of said units of each of said planetary gear mechanisms being fixed against relative rotation with respect to the corresponding of said axle shafts, and selectively operable means for locking said sun gear unit of each of said planetary gear mechanisms against rotation relative to the corresponding of said shafts or to said corresponding shaft for equal rotation therewith.

2. In a driving mechanism, in combination, a ring gear, a differential housing fixed thereto for equal rotation therewith, a pair of axle shafts projecting into said housing, differential gears in said housing including pinions bodily movable with said casing and a pair of side gears in mesh with said pinions, said side gears being rotatably mounted relative to said axle shafts, a pair of planetary gear mechanisms including an internal gear, a sun gear and a planetary pinion unit, said internal gear of each of said planetary gear mechanisms being fixed against relative rotation with respect to the corresponding of said side gears, said planetary pinion unit of each of said planetary gear mechanisms being fixed against relative rotation with respect to the corresponding of said axle shafts, and selectively operable means for locking said sun gear of each of said planetary gear mechanisms against relative rotation or to the corresponding of said shafts for equal rotation therewith.

3. In a driving mechanism, in combination, a ring gear, a differential housing fixed thereto for equal rotation therewith, a pair of axle shafts projecting into said housing, differential gears in said housing including pinions bodily movable with said casing and a pair of side gears in mesh with said pinions, a pair of planetary gear mechanisms including an internal gear, a sun gear and a planetary pinion unit, said planetary pinion unit of each of said planetary gear mechanisms being fixed against relative rotation with respect to the corresponding of said side gears, said internal gear of each of said mechanisms being fixed against relative rotation with respect to the corresponding of said axle shafts, and selectively operable means for locking said sun gear of each of said planetary mechanisms against rotation, or to the corresponding of said shafts for equal rotation therewith.

4. In a driving mechanism, in combination, a ring gear, a differential housing fixed thereto for equal rotation therewith, differential gears in said housing including pinions bodily movable with said casing and a pair of side gears in mesh with said pinions, a pair of axle shafts projecting into said housing, a pair of planetary gear mechanisms including an internal gear, a sun gear and a planetary pinion unit, said internal gear of each of said mechanisms forming a unit with the corresponding of said side gears and being insertable into and removable from said housing as such, said planetary pinion unit of each of said mechanisms being fixed against relative rotation with respect to the corresponding of said axle shafts, and selectively operable means for locking said sun gear of each of said mechanisms against rotation, or to the corresponding of said shafts for equal rotation therewith.

5. In a final drive mechanism, a ring gear, a differential housing secured thereto for equal rotation therewith, bearings at opposite ends of said housing for rotatably supporting the same, a pair of rotatable axle shafts projecting into said housing, differential mechanisms centrally disposed in said housing and including pinions and a pair of side gears, a planetary gear mechanism in said housing on each side of said differential mechanism, one element of each of said planetary gear mechanisms being locked to the corresponding side differential gear for equal movement therewith, and another element of each of said planetary gear mechanisms being locked to the corresponding of said axle shafts for equal rotation therewith.

6. In a final drive mechanism, a ring gear, a differential housing secured thereto for equal rotation therewith, bearings at opposite ends of said housing for rotatably supporting the same, a pair of rotatable axle shafts projecting into said housing, differential mechanisms centrally disposed in said housing and including pinions and a pair of side gears, a planetary gear mechanism in said housing on each side of said differential mechanism, one element of each of said planetary gear mechanisms being locked to the corresponding side differential gear for equal movement therewith, another element of each of said planetary gear mechanisms being locked for equal rotation with the corresponding of said shafts, and selectively operable means for locking a third element of each of said planetary gear mechanisms to the corresponding of said shafts for equal rotation therewith, or against rotation.

7. In a final drive mechanism, a ring gear, a differential housing secured thereto for equal rotation therewith, bearings at opposite ends of said housing for rotatably supporting the same, a pair of rotatable axle shafts projecting into said housing, differential mechanism centrally disposed in said housing and including pinions and a pair of side gears, a planetary gear mechanism in said housing on each side of said differential mechanism, one element of each of said planetary gear mechanisms being locked to the corresponding side differential gear for equal movement therewith, another element of each of said planetary gear mechanisms being locked for equal rotation with the corresponding of said shafts, and clutch means disposed exteriorly of said housing for selectively locking a third element of each of said planetary gear mechanisms against rotation, or to the corresponding of said shafts for equal rotation therewith.

8. In a final drive mechanism, a differential housing, means for driving said housing, bearings at opposite ends of said housing for rotatably supporting it, differential gears in said housing, an axle shaft projecting into said housing through one of said bearings, a planetary gear mechanism in said housing driven from one of said differential gears and having an element thereof locked to said shaft for equal rotation therewith, means extending into said housing through one of said bearings locked to an element of said planetary gear mechanisms, and clutching means exterior of said housing cooperating with said extending means for selectively locking said element locked thereto to said shaft for equal rotation therewith, or against rotation.

9. In final drive mechanism, in combination, a differential housing, means for rotating said housing, bearings at opposite ends of said housing for rotatably supporting the same, the ends of said housing received within said bearing being hollow, a sleeve rotatably received within each of the hollow ends of said housing, an axle shaft projecting into said housing through each of said sleeves and rotatably mounted relative thereto, differential gears in said housing, a planetary gear mechanism within said housing on each side of said differential gears, means for driving said planetary gear mechanisms from said differential gears, each of said planetary gear mechanisms including a sun gear locked against relative rotation to the corresponding of said sleeves, and selectively operable means for locking each of said sleeves against relative rotation, or to the corresponding of said shafts for equal rotation therewith.

10. In a final drive mechanism, in combination, a ring gear, a differential housing secured thereto for equal rotation therewith, a pair of axle shafts projecting into said housing, differential gears in said housing including differential pinion gears bodily movable with said housing and a pair of differential side gears, a planetary gear mechanism positioned within said housing on each side of said differential gears and each including an internal gear unit, a sun gear unit and a planetary pinion unit, said side gears having bearings in said housing at their peripheries and each of said side gears being locked for equal rotation with one of said units of the corresponding of said mechanisms, another unit of each of said mechanisms being locked for equal rotation at all times with the corresponding of said axle shafts, and selectively operable means for locking the third unit of each of said mechanisms against bodily rotation, or for bodily rotation with said corresponding mechanism.

11. In a final drive mechanism, in combination, a ring gear, a differential housing secured thereto for equal rotation therewith, bearings at each end of said differential housing for rotatably supporting the same, each of said bearings including a race member, differential gear mechanisms within said housing including differential side gears, a pair of axle shafts projecting into said housing through said bearings, a planetary gear mechanism connecting each of said side gears with the corresponding of said shafts, and clutching means for controlling the operativeness of the speed varying characteristics of each of said planetary gear mechanisms, one element of each of said clutching mechanisms being formed as an integral part of the corresponding of said raceways.

12. In a final drive mechanism, in combination, a ring gear, a differential housing secured thereto for equal rotation therewith, differential mechanism within said housing including differential pinions bodily movable with said housing and a pair of differential side gears in mesh with said pinions, a pair of axle shafts projecting into said housing, a planetary gear mechanism connecting each of said side gears with the corresponding of said axle shafts, each of said planetary gear mechanisms including an internal gear unit, a planetary pinion gear unit and a sun gear unit, selectively operable means for locking each of said sun gear units against rotation or to the corresponding of said axle shafts for equal rotation therewith, each of said axle shafts being provided with a supporting member for another of said units of the corresponding of said planetary gear mechanisms, said supporting members each being provided with a bearing surface, and the remaining unit of each of said planetary gear mechanism being locked to the corresponding of said side gears for equal rotation therewith and having bearing upon the corresponding of said bearing surfaces.

13. In a final drive mechanism, in combination, a ring gear, a differential housing secured thereto for equal rotation therewith, differential mechanism within said housing including a plurality of differential pinions bodily movable with said housing and a pair of differental side gears in mesh with said pinions, a pair of axle shafts projecting into said housing, a planetary gear mechanism connecting each of said side gears with the corresponding of said axle shafts, each of said planetary gear mechanisms including an internal gear unit, a sun gear unit and a planetary pinion gear unit, means for locking one of said units of each of said planetary gear mechanisms to the corresponding of said side gears for equal rotation therewith at all times, means for locking another of said units of each of said planetary gear mechanisms to the corresponding of said axle shafts for equal rotation therewith at all times, and selectively operable means for locking the remaining unit of each of said planetary gear mechanisms against rotation or to the corresponding of said axle shafts for equal rotation therewith, said planetary pinion gear unit of each of said planetary gear mechanisms including a pair of axially spaced members between which the planetary pinion gears are rotatably mounted, and posts formed on at least one of said members cooperating with the other of said members for positively spacing said members apart.

14. In a final drive mechanism, in combination, a ring gear, a differential housing secured thereto for equal movement therewith, differential mechanism within said housing including pinions and a pair of side gears in mesh therewith, bearings of the rolling element type receiving the opposite ends of said housing for rotatably supporting the same, a pair of axle shafts projecting into said housing through said bearings, a planetary gear mechanism connecting each of said side gears with the corresponding of said axle shafts, and throw-off means rotatably associated with each of said bearings for limiting the escape of lubricant therethrough.

NEIL S. LINCOLN.